(12) United States Patent
Nicolaidis

(10) Patent No.: US 7,124,348 B2
(45) Date of Patent: Oct. 17, 2006

(54) DATA STORAGE METHOD WITH ERROR CORRECTION

(75) Inventor: Michael Nicolaidis, Saint Egreve (FR)

(73) Assignee: iROC Technologies, Grenoble (FR)

( * ) Notice: Subject to any disclaimer, the term of this patent is extended or adjusted under 35 U.S.C. 154(b) by 154 days.

(21) Appl. No.: 10/494,080

(22) PCT Filed: Oct. 31, 2002

(86) PCT No.: PCT/FR02/03756

§ 371 (c)(1),
(2), (4) Date: Jul. 6, 2004

(87) PCT Pub. No.: WO03/038620

PCT Pub. Date: May 8, 2003

(65) Prior Publication Data

US 2005/0028061 A1 Feb. 3, 2005

(30) Foreign Application Priority Data

Nov. 2, 2001 (FR) ................................. 01 14231
Jul. 9, 2002 (FR) ................................. 02 08626

(51) Int. Cl.
*G11C 29/00* (2006.01)
*H03M 13/00* (2006.01)

(52) U.S. Cl. .................................................. 714/767
(58) Field of Classification Search ................ 714/763, 714/767

See application file for complete search history.

(56) References Cited

U.S. PATENT DOCUMENTS 4,277,844 A * 7/1981 Hancock et al. ............. 714/755
5,357,529 A * 10/1994 Tatosian et al. ............. 714/723
5,841,795 A * 11/1998 Olarig et al. ................ 714/768

OTHER PUBLICATIONS

French Search Report for application PCT/FR02/0358 of international date of Oct. 31, 2002 and published as WO 03/038620 A2 on May 8, 2003 covering French applications FA 613226 and FR 0114231 dated Aug. 9, 2002. The report cites US Patent 3,814,921 dated Jun. 4, 1974 and 3,573,728 issued Apr. 6, 1971, International Publication No. WO 01/14971 A1 dated Mar. 2001 and EP 0 491 073 A dated Jun. 24, 1992, copies of which are included herein.

* cited by examiner

Primary Examiner—Shelly Chase
(74) Attorney, Agent, or Firm—Erwin J. Basinski

(57) ABSTRACT

The invention concerns a data storage method enabling error detection and correction in an organized storage for reading and writing words of a first number (m) of bits and optionally for modifying only part of such a word, comprising the following steps which consist in: associating an error detection and correction code with a group of a second number ($k \geq 1$) of words; and at each partial writing in the group of words, calculating a new code of the modified group of words; performing a verification operation and, if an error occurs, carrying out an error correction of the modified word and/or of the new code.

15 Claims, 1 Drawing Sheet

Figure 1:
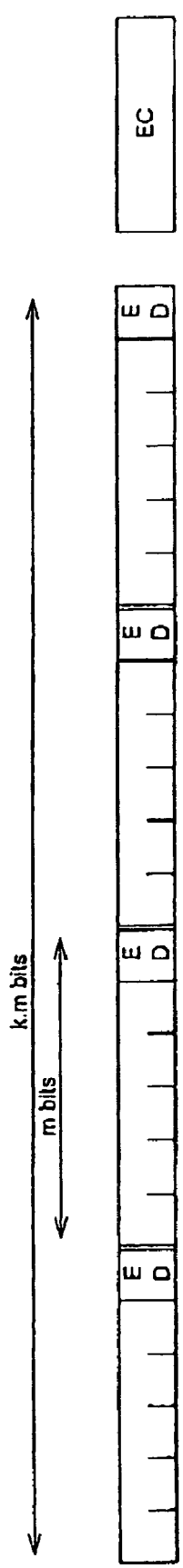

DATA STORAGE METHOD WITH ERROR CORRECTION

CROSS-REFERENCE TO RELATED APPLICATIONS

This application is related to the following issued patent and co-pending U.S. Applications:

U.S. Pat. No. 6,946,985 B2 issued Sep. 20, 2005 titled "Device for Reconfiguring a Faulty Storage Assembly."

U.S. patent application Ser. No. 09/936,032 filed Mar. 11, 2002, titled"Logic Circuit Protected Against Transient Disturbances."

U.S. patent application Ser. No. 10/286,686 filed Nov. 1, 2002, titled "Reconfiguration Device for a Faulty Memory." (51484000200)

U.S. patent application Ser. No. 10/379,126 filed Mar. 3, 2003, titled "A Reconfiguration Device for a Faulty Memory."

U.S. patent application Ser. No. 10/650,066 filed Aug. 26, 2003, titled "Evaluation of the Characteristics of Electric Pulses."

U.S. patent application Ser. No. 10/492,294 filed Apr.9, 2004, titled "Circuit Architecture Protected Against Perturbations."

The present invention relates to the organization of a memory associated with error-correction means.

Given the present miniaturization of integrated circuits and especially of memory circuits, memory points ensure the storage of data bits by acting on a smaller and smaller number of charge carriers. Accordingly, each memory point is more and more likely to be affected by an error, that is, with an inversion of the stored datum (switching from 0 to 1 or from 1 to 0), especially due to an irradiation by particles. To overcome this disadvantage, error-correction codes have been developed, each memory word being associated with an error-correction code. When the content of a word and the associated error-correction code are read and a syndrome is calculated between the stored word and the error-correction code, this syndrome enables determining whether the word contains an error or not, determining the location of the error, and correcting this error.

Examples of known error-correction codes are the Hamming code and the Reed-Solomon code. It should be noted that simple error-detection codes, for example, the association of a parity bit with a word, which enable detecting the existence of an error, should be distinguished from error-correction codes, which enable determining the location of the error, and thus correcting it.

An obvious disadvantage of the use of error-correction codes is the amount of bits that they require. For example, for words of more than four bits, a Hamming code requires n+1 bits to enable correction of one error, and of one error only, in a $2^n$-bit word. This means that, for an eight-bit word ($2^3$), four code bits will be required, and even five bits if a parity code is added to the error-correction code. For a 64-bit word ($2^5$), five or six error-correction code bits will be required. Clearly, the relative surface area taken up by the memory portion assigned to the error-correction code depends on the length of the stored words and decreases as this length increases.

However, many memories are provided to perform operations on relatively short words.

On the other hand, organizations in which it is possible to change a portion only of a word are often used. Such operations are called maskable operations, that is, a mask is provided in a write operation to only affect some of the bits of a word. A problem then arises, which is that the error-correction code of the modified word no longer corresponds to this word. This leads to associating an error-correction code with each bit of a word, which requires, as seen hereabove, a use of extremely long code words with respect to the stored words.

Thus, an object of the present invention is to provide a memory organization associated with an error-correction system in which short words can be used while using a reasonable number of error-correction code words, without excessively increasing the circuit complexity or consumption.

Another object of the present invention is to provide a memory organization in which maskable operations can be performed and an error-correction code can be used in simple fashion.

To achieve these objects, the present invention provides a data storage method enabling error detections and corrections in a memory organized to read and write words of a first number (m) of bits and possibly to modify a portion only of such a word, comprising the steps of:

associating an error detection and correction code with a group of a second number $k \geq 1$ of words; and at each partial writing in the word group:

calculating a new code of the modified word group, implementing a checking operation and, if an error appears, making an error correction of the modified word and/or of the new code.

The present invention also aims at a memory for implementing the method.

The present invention also provides a data storage method for error detections and corrections in a memory in which the words are divided into a plurality of fields, the writing operation being implementable on all the bits of one or more fields, comprising the following steps:

associating an error-correction code, called "field code", to each field of a word, and during a writing in one or more fields of a word, activating a writing in the corresponding field code(s), the values to be written in each field code being calculated from the values of the bits to be written in the corresponding field.

Figure 2:
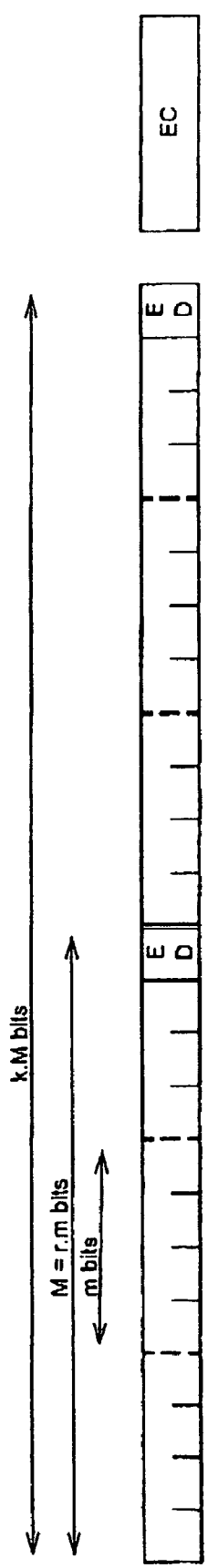
Figure 3:

The foregoing objects, features, and advantages of the present invention will be discussed in detail in the following non-limiting description of specific embodiments in connection with the accompanying drawings, among which:

FIGS. 1 to 3 illustrate structures of memory blocks according to the present invention.

As shown in FIG. 1, given a memory provided to normally read and write m-bit words, the present invention provides associating with a group of k words, that is, a set of k.m bits, a single error-correction code EC. Thus, one error-correction code is used for a set of k.m bits and no longer k error-correction codes, each of which corresponds to a set of m bits. As will be induced from the numerical examples given hereafter, this will greatly reduce the dimension taken up in the memory for the error correction. Of course, this is done at the cost of a slight increase in the surface area taken up by the error-correction code calculation means. However, this increase is negligible since the same calculation means are used and determine the correction codes for all memory blocks.

Further, according to an embodiment of the present invention, an error-detection code ED is assigned to each m-bit word, for example, in the case where there cannot be more than one error per word, a simple parity bit.

According to an embodiment of the present invention, illustrated in FIG. 2, in the case of short words, for example, 4-bit words (m=4), the short words will preferably be gathered in long words of r.m=M bits (for example, 64 bits) and an error-correction code, for example, a parity code ED, will be assigned to each long word only. k long words will then be assembled in a group of k.M-bit words with which is associated an error-correction code EC.

In what follows of the present description, unless specifically indicated, term "word" may be interpreted as designating a short word or a long word.

For example, if in a system a memory with a 4-bit word is assumed to be used, 3 additional bits per word must be provided to implement the Hamming code. To reduce this cost, it is advantageous to introduce long words and maximize their size to minimize the code cost, but it is not desired to use very large long words to avoid a very high consumption upon reading. Long words of 64 bits (r=16) may for example be chosen. Then, groups of a still larger size may be chosen (for example, groups of 4 long words). In this case, one parity bit will be associated with each long word, and one Hamming code (9 bits) will be associated with each word group. This results in a cost equal to $\frac{1}{64}+\frac{9}{256}=9.75\%$ instead of 75% for one Hamming code per 4-bit word.

The number of bits of a word of a memory is generally determined according to functional constraints and constraints of operation speed of the system in which the memory is inserted. To implement the present invention, the memory will be modified to increase the size of the word that it will be possible to read in one read cycle. Long words formed of r m-bit words are thus obtained, which will be readable within a single cycle. Thus, when the system activates a read cycle intended for an m-bit word, a long word of r.m bits which contains the short word for which the reading is intended will be read, this m-bit word will be provided to the system, and the long word of r.m bits will be locally used for error detection and/or correction needs.

A memory normally provided for m bit words cannot perform readings over r m-bit words, which is necessary if long words are desired to be used. The memory must thus be modified, which normally causes a lengthening of the system design time. However, memories with maskable operations are more and more often to be found in known memory generators. Such a memory using r.m-bit words can then be chosen to be able to carry out the reading over the long word, as well as maskable write operations which will enable writing on the m bits of a short word or on a subset of these bits in the case where the original memory enables performing maskable operations on a subset of the m bits of the word.

Reading of a Word

For the reading of a word (short or long), it is proceeded as usual, that is, its error-correction code is first analyzed. In most cases, there will be no error and the word is read normally. If there is an error, all the words in the word group are read and the error position is identified by calculating the syndrome with the error-correction code. The error is then corrected at the indicated position. It is thus avoided to read a complete group at each reading and, normally, a reading is no longer than with a conventional memory organization.

It may be preferred not to add an error detection bit to each word to save memory space and a word group and the error-correction-code will systematically be read upon each reading.

Writing of a Word

The problem is slightly more complex upon writing. Indeed, on each writing of a new word, the error-correction code of the word group must be modified to be adapted to the modified word of the word group. Two embodiments of the present invention will be provided hereafter to solve this problem.

First Embodiment of a Writing

Before each writing, the considered word is first read, and it is examined whether its detection code ED indicates an error or not. If there is an error, the read word is first corrected by using the error-correction code of the group as indicated hereabove in relation with the read operation. Then, the initial word or the corrected read word having been temporarily stored in a register, and the new error-correction code is calculated.

A first way of calculating the new error-correction code consists of taking into account the comparison between each bit of the initial word or of the corrected word and each bit of the newly-written word as well as of the previous code value. This may be performed conventionally by networks of XOR gates. It should be noted that this method is suitable whether a complete word is written in the preexisting word's place or only a few bits of a word are rewritten (masked writing).

In the case where the group contains a single short or long word, and where the write operation is performed over a subset of bits of the word (maskable operation) or of the long word (maskable or non-maskable operation), it is possible to only use the error-correction code, which is then also used as an error-detection code. Still in the case where the group contains a single word, the calculation of the new code is performed in a second manner, directly from the values of the written bits and the values of the bits non-affected by the writing (non-written). In this case, the non-written bits of the read word must be corrected, if erroneous. The correction will be performed by using the read word and its code. This correction is performed to calculate the new code by using correct values in the non-written bits of the read word.

The error-correction code modification operation of this second manner requires for a reading (of a word or of a non-written portion of a word) to be performed before each writing.

In practice, the use of a read cycle before a writing is in many cases not impairing since many memories systematically provide a reading before a writing or use an idle cycle before or after each writing.

Thus, certain memories, for example cache memories, standardly use a read cycle before a write cycle. In this case, the discussed techniques introduce no reduction of the system performances. On the other hand, reading several words before a writing is advantageous since these words can be stored in a buffer and, if afterwards one of these words is to be read, a very fast reading can be performed by reading the word from the buffer. Several words may also be written into the buffer before writing any long word into the memory. This technique is often used to increase the speed of read and write operations. Thus, code cost reduction requirements combine with speed increase requirements.

In certain memories, for example, DRAM memories, the cycle comprising a reading followed by a writing standardly exists for reasons specific to the memory operation.

In other memories, it is necessary to add a read cycle before each writing.

According to an aspect of the present invention, the memory operation is modified to be able to sequentially read and write a word or a portion thereof within the same memory access cycle. This is possible since, the word being selected at the beginning of the cycle, the read amplifiers are first activated to be able to read the word, and the write amplifiers of all the bits in the words or of a portion thereof are then activated to perform a non-maskable or maskable writing. This modification suppresses the read cycle which must come before a write cycle, but the cycle duration will be extended.

According to an alternative of this first embodiment of the present invention, in the case where it is assumed that there cannot be more than one word affected by errors in a group of k m-bit words, rather than using an error-correction code associated with the k.m bits, an error-correction code nay be calculated for each m-bit word, and the XOR function of the k calculated codes may be taken as the error-correction code of the word group. The indication of the words in which the possible error will exist will be provided by the error-detection code (ED) associated with each word. Of course, in this case, if more than one error-detection code associated with more than one word indicates an error, this will mean that a non-correctable error is present.

Optimizing of the Read-write Synchronization of the First Embodiment

The present invention also aims at optimizing the read/write speed. In the foregoing, it has been indicated that to perform a write operation in certain bits of a word, the actions of the following list are carried out.

1) reading the existing word (it should be reminded that in the present example, term "word" designates a short word or a long word), 2) reading the error-correction code, by abbreviation, "code", of this word, 3) correcting the errors of the read word, if present, 4) modifying the read word by replacing with new values the values of the bits in write positions, 5) calculating the code of the modified word (new code), 6) writing the new values in the write bits of the word, or writing the entirely modified word, 7) writing the new code.

It can be seen that the word is read, modified, and written (actions 1, 4, and 6). Since the modification consists of substituting, for a portion of the read word, data previously made ready, no delay is induced by the modification. However, the read word must be checked by its code and corrected in case an error is detected. Such operations require some time to be carried out and may introduce an additional delay between the read operation and the write operation. This is particularly true if the reading and the writing are performed within the same cycle, since the data are written immediately after the reading. On the other hand, when the reading and the writing are carried out in two successive cycles, there may be some available time between the data read time and the write time (for example, the data may be available before the end of the read cycle). However, according to the memory type, this time can be very short, or even zero. For example, in some memory types, the data to be written must be placed at the memory inputs for a given time period, before the beginning of the write cycle (set-up time).

According to an aspect of the present invention, to eliminate the additional delay induced by the data correction, the modified word (or the values of the modified bits) will be written before the end of the checking and correction of the read data. This checking will be performed in parallel with the writing and in case of an error detection, the corrected read data are rewritten. Of course, during this new writing, the values of the bits in write position are replaced with the new values to be written in these positions. Thereby, in most cases, that is, when there is no error, the successive read and write operations will be carried out with no additional delay, and an additional write cycle is added in case of an error detection only. A signal may then be generated to indicate to the system that the memory is not accessible. The system may react to this signal by entering, for example, a wait cycle. It should however be noted that the writing of the correct word is not indispensable since the error will be detected and corrected the next time that the word will be written, provided that the new correction code has been properly calculated and stored.

A delay introduced for the modified word code calculation can also be observed. This calculation must be performed systematically, that is, upon each read/write cycle. It has been seen that for each writing into the memory, a reading of the code, followed by a writing of the new code (actions 2 and 7) must be performed. The time available between the code reading and its writing risks not being enough to calculate the new code. To maintain the operating speed, the new code must be prepared in advance, that is, before reading the preceding code. This constraint leads to using the second way of calculating the code, that is, to calculating the new code based on the value of the bits to be written in the write positions of the read word and on the value of the other positions of the read word. Indeed, the first way to calculate the new code uses the read code to calculate the code to be written, and introduces a delay between the time when the code is read and the time when the new code is ready for its writing. However, the second way to calculate the new code calculates the code to be written from the bits to be written in the word and the bits read in the non-written positions of the word. The word can then be read and the calculation of the new code can be started before reading the former code of the word.

Separated memories (that is, independently controllable in read/write mode) are used for data words and for the corresponding error-correction codes. In the code memory, the operations will be offset in time with respect to the operations in the word memory. Thereby, there is time to previously calculate the new code and write the new code, without introducing any delay between the reading of the former code and the writing of the new one.

Thereby, the duration of the code memory cycle will not be affected. However, this offset between the cycles of the two memories may delay the error correction in the word and in its code, since the code is read with a delay with respect to the reading of the corresponding word. It should however be noted that the delay in the code reading will not be entirely added to the time required to perform the word correction. Indeed, the calculations required to correct the read word can start before the code reading, since the first part of these calculations only uses the read word. In fact, the correction usually starts with the calculation of the code of the read word to then compare it with the code of that word stored in the code memory. There however remains that the word correction may introduce a delay on the reading.

There are two types of read operations: readings introduced before a writing to enable calculation of the new code, and readings performed in a normal read cycle. In the first case, the delay introduced by the error correction can be avoided by using the previously-described technique to avoid a delay in the word writing. By using this technique, the code will be calculated before correcting a possible error in the read word, and it will be written into the code memory without waiting for the word correction. The read word is corrected in parallel, and only in the unusual situation where an error will have been detected and corrected, is the code recalculated by using corrected data and it is rewritten into the code memory. In this case, a signal which indicates to the system that the memory is not accessible is activated. In a normal read cycle, this delay can be avoided by using the technique discussed in French patent application N° 01/10735. According to this technique, the read data are immediately used by the system, without waiting for the correction of possible errors. In parallel, the control and correction of the read data is performed, and only when an error is detected is the system operation interrupted and are the corrected read data propagated to the system portions contaminated by the erroneous read data.

According to another alternative of the first embodiment, a dual-access memory is used: the first access enabling read operations and the second one enabling write operations. If cycle i of the memory is a read cycle, the read operation will be performed through the first access. If cycle i is a write cycle, the word or the long word concerned by the writing will be read through the first access during cycle i, and the writing will be performed during cycle i+1 through the second access, leaving the first access available to perform the normal operation corresponding to cycle i+1. This operation will necessarily be a reading, since even if the normal operation of cycle i+1 is a writing, it has been seen that the writing will be performed at the next cycle (i+2) while during cycle i+1, the word concerned by the writing will be read.

Usually in dual-access memories, it is forbidden to perform a reading and a writing in the same word during the same cycle. There will thus be a problem if the reading and the writing performed during cycle i+1 affect the same word. However, in this case, the data required by the reading are present at the input of the second access. These data will then be used to provide the data required by the reading. Given that the writing can only be performed over a portion of the word, the data at the input of the second access risk not comprising all the bits required by the reading. To avoid this problem, the bits of the read word are stored at the end of cycle i, and some of these bits will be replaced with the bits to be written present at the input of the second access during cycle i+1. All the bits that can be required by the reading of cycle i+1 will thus be available.

The techniques described hereabove to avoid increase of the memory cycle duration, caused by the code calculation and the data correction, may also be used in the case of this alternative of the first embodiment. For example, separated memories will be used for the data words and for the corresponding error-correction codes. In the code memory, the operations will be shifted in time with respect to the operations in the word memory. However, dual-access memories usually enable using independent clocks for the two accesses. In this case, the access used for the writings can be clocked by using a clock offset with respect to the clock used to clock the access used for readings. By adequately choosing this offset, a sufficient time period can be made available between a reading and the next writing to calculate the new code, which could in this case be performed in the first or in the second manner. The use of a dual-access memory instead of a single-access memory will have a certain cost. However, in some situations, dual-access memories are available to perform single-access memories. Thus, certain FPGA families comprise dual-access embarked memories, to satisfy the needs of users requiring a single-access memory and of those requiring a dual-access memory. Thus, the user requiring a single-access memory may advantageously implement the first alternative of the first embodiment.

Second Embodiment of a Writing

According to a second embodiment of the present invention, it is desired to avoid reading bits in bit positions where it must then be written, to avoid the above-mentioned disadvantages of the first embodiment. For this purpose, each time a masked writing in a short word, or a masked or unmasked writing in a word of a long word, is desired to be performed, the writing of the write positions and the reading of the other positions in the word (short or long) are performed simultaneously. Many existing memories may be adapted to the implementation of the present invention. For example, it is relatively simple to modify an existing memory for, each time a word is addressed, connecting the bit positions in which it is desired to be written to a write amplifier and the other bit positions of the same word to a read amplifier.

According to this second embodiment, the new error-correction code (and the new error-detection code if required) is calculated by using the value of the bits to be written and the value of the other bits of the word, or of the long word according to the second alternative implementation of the code calculation discussed hereabove. The present invention also provides detecting and correcting an error in the read bits before using them to calculate the new code.

According to an aspect of the second embodiment, the code associated with the word (short or long) is capable of detecting and correcting an error in the non-written positions of the read word without knowing the value of the written positions.

This second embodiment more specifically applies to the case where the words are short and/or a masked writing is performed, that is, where it is written in some bits only of a word. For example, as illustrated in FIG. 3, it is desired to write in the two bit positions marked with a cross of the second word, or in a "short word" forming an element of a "long word".

According to a first alternative of this second embodiment, the read bits are considered and all the possible values are given to the bits modified by the write operation. For each of these values, the syndrome of the word (short or long) is determined by means of its error-correction code. Clearly, among all the possible values, there is the initial bit value. Then, for this value, if there is no error in each of the read bits of the word, the syndrome will indicate a zero error. It will then be known that the new error-correction code can be validly calculated from the newly-written bits and the read bits. If the minimum of the detected error number is non-zero, it will be known that there is an error in the non-written bits of the word or long word, and for this minimum value, an error correction will be performed before proceeding to the calculation of the new code as indicated hereabove.

According to an aspect of the second embodiment, the code associated with the word (short or long) is capable of detecting an error in the read bits of the word, combined with any error in the bits aimed at by the writing, of making out the word which only contains the error in the read bits, from the words that contain the error in the read bits as well as any error in the bits aimed at by the writing, and of correcting the error in this word.

If the error in the read bits of the word can affect at most t bits, if the maximum number of bits in the word affected by a writing is q, it is provided for the code associated with the word to be able to detect any error having a multiplicity smaller than or equal to q+t, and among any group of errors having multiplicities greater than 0 and smaller than or equal to q+t, to be able to distinguish the error having the smallest multiplicity, and to be able to correct in a word or long word any error having a multiplicity which does not exceed t.

According to an aspect of the first alternative of the second embodiment, during a writing over certain bits of a word (short or long), the word code is used to check all the words by using all possible values for the positions in the word aimed at by the writing as well as the values read in the other positions in the word or long word. If this checking indicates an errorless word, then the read bits contain no error. All the value of the read bits, the values of the written bits and the read code are thus used to calculate the new code. If however this checking finds no errorless word, then there is an error in the read bits and it must be corrected before calculating the new code. The word containing errors in the read positions only being distinguished by the code, the code will be used to correct the error in this word and thus obtain the correct values in the read bits.

In an embodiment of the first alternative, memories such that at each write cycle, it is written either on a single bit of the word (short or long), or on all the word bits (case of memories having one-bit words in which long words comprising r one-bit words are formed, r>1, or case of memories using m-bit words, comprising either writings operating over all the word bits, or maskable writings operating on a single bit in the word). The errors taken into account are errors affecting a single bit in the word or long word. According to this embodiment, the error-correction code associated with the word or with the long word is a simple error correction code capable of making out double errors from simple errors (for example, Hamming code increased by the parity bit of the word or long word and of its code). When it is written on all the bits in the word or long word, the new code of the word or long word is calculated in standard fashion. When it is written on a single bit, two words or long words are checked with the code, one being formed by associating with the read bits value 0 for the bit to be written, the other being formed by associating with the read bits value 1 for the bit to be written. If one of these checking operations detects no error, then the read bits are correct and can be used to calculate the code. If errors are detected on the two words thus formed, then the word for which a simple error has been detected contains the right value for the bit aimed at by the writing. The code is used to correct the error in this word. The read bits obtained in the corrected word, the values to be written in the bit aimed at by the writing, and the old code are then used to calculate the new code.

According to a second alternative of the second embodiment of the present invention, the write operations may be performed on all the bits in an m-bit word of a long word, or on a subset of these bits (masked writing). The errors taken into account can affect a single word of a long word. A code called a "calculation code", capable of calculating the values of the bits of a word by using the bits values of the other words in the long word, as well as a code called a "correction code" capable of detecting and correcting an error in a word of the long word combined with the error introduced in another word of the long word (the word to be written) when this word is calculated by using the calculation code and the other words of the long word that then comprise the erroneous word, are associated with each long word.

According to an embodiment of this second alternative, it is provided for the calculation code to be able to detect its own errors. In case of an error detection in this code, let us consider that there is no error in the read words of the long word (given that it is assumed that an error can affect neither two words of the long word nor a word and the code). It is thus avoided to introduce an error in the read bits by trying to correct them with an erroneous calculation code.

The case where the errors taken into account are errors likely to affect a single bit of a long word is considered. The calculation code comprises m bits. The bit having position i in this code is equal to the parity of the bits of position i of all the words in the long word. To detect errors in this code, a bit calculating its parity is associated therewith (it can be observed that the parity of the calculation code also is the parity of the long word). The nature of the correction code will be specified further. In a masked or unmasked reading of a word, all the non-written bits of the long word associated with the written word, as well as the calculation code with its parity and the correction code, are read simultaneously. The calculation code is checked by using its parity. If an error is detected, it is considered that there are no other errors in the long word (hypothesis of a single error), and the values of the read bits and of the written bits are then used to calculate the new calculation code with its parity and the new correction code. If no errors are detected in the calculation code, the bits of the word aimed at by the writing are calculated, by using the calculation code and the words of the long word which are not aimed at by the writing. There then is a complete long word and the correction code can be used to detect the errors in this long word and correct them. The long word will be erroneous if there is an error (by assumption, single) on a read word. Since the value of the bits of the word aimed at by the writing is calculated by using, among others, the erroneous read word, there will also be an error on the word aimed at by the writing at the same position as the error on the erroneous read word. A double error-correction code may be used as a correction code. This code enables detecting a double error and correcting it. The correct read bits and the written bits will then be used to calculate the new codes. However, a double error-correction code is much more expensive than the Hamming code. To reduce the cost, the Hamming code will be used. It enables detecting a double error, but is in principle unable to correct it. However, it can be observed that the considered double errors affect a position in a known word (the word aimed at by the writing) and the same position in an unknown word. For each word aimed at by the writing, the syndromes of the Hamming code can be previously calculated for all the double errors having this property. There are $m(r-1)$ error couples and corresponding syndromes for each word aimed at by the writing. A table can then be created and the corresponding double error can be stored for each syndrome. Then, upon correction of a double error, its syndrome is calculated and the double error corresponding to this syndrome is searched for in the table. All the word positions indicated by this double error are then corrected to correct it. However, some of the double errors may have the same syndrome, and the Hamming code is then increased by adding additional bits enabling differentiating the syndromes for such double errors. Often, a single additional bit will be enough, but a larger number of bits may be necessary in some cases. A more economical way is to develop a dedicated code capable of detecting and correcting single errors as well as the above-mentioned double errors. A computer program may be developed to automatically generate this type of code.

Optimizing of the Read-write Synchronization of the Second Embodiment

To perform a writing according to the second embodiment, the actions of the following list are carried out.

1) writing the new values into the write positions of the word (short or long) and simultaneously reading the other positions of this word (hereafter, "read positions"), 2) reading the error-correction code of the word (hereafter, "code"), 3) using the values of the read positions of the word and the word code, to correct the values of these positions, 4) in case of an error detection and correction, optionally rewriting the corrected values (this action is not necessary, since the error could be detected and corrected at the next reading of the erroneous word), 5) using the values (possibly corrected) of the read positions of the word and the values written into the write positions to calculate the code, 6) writing the code thus calculated.

It can be observed that to perform a writing on a portion of the word, a read operation and a write operation of the word code are performed. Given that a single cycle is available for the two operations, a separate memory will be used for the codes and one of the three following techniques will be adopted.

The code memory being smaller than the data memory, it will be faster. It may in this case be provided to perform a read operation followed by a code write operation within the duration of a single write cycle into the data memory. The two operations may be carried out within a single cycle of the code memory (read-write cycle), or within two cycles of this memory.

If this first approach is not possible, a dual-access memory enabling performing within the same cycle a read operation from the first access and a write operation from the second access will be used for the code.

A third solution may apply in the case where the word is formed of several fields and each partial write operation is always performed over all the bits of different fields concerned by the writing. An error-detection code will then be added to each field (for example, a parity bit), and the fields read in a partial write operation will be checked by means of this code. The error-correction code will be stored in another memory, the operation of which is offset with respect to the data and error-correction code memory. Thus, the read fields will be checked by the error-detection codes and the new error-correction code will be calculated before starting the operation cycle in the error-correction code memory. If no error is detected in the read fields, then the error-correction code thus calculated is written into the code memory. However, in the unusual case where an error is detected in the read fields, the error-correction code is read, and will be used to correct the error in the read fields, the new error-correction code is calculated, and this code is written into the error-correction code memory. Thus, in the unusual case of an error detection, two operations in the error-correction code memory and calculations will have to be performed. These operations and calculations might occupy the error-correction code memory for several cycles. A signal will then be activated to indicate to the system that this memory is not accessible for a number of cycles. The system may react to this signal by, for example, entering a wait cycle.

Techniques previously described in the context of the first embodiment may also be used in the context of the second embodiment to avoid increasing the memory or system cycle time, because of the different code calculations and of the error correction.

These techniques have been discussed in the context of an error correction in memories used by an electronic system as single-access memories, but those skilled in the art can readily adapt them for memories used by an electronic system as multiple-access memories (multiport) by applying them on each access of such a memory.

The second embodiment of the present invention has the advantage with respect to the first one of adding no cycle time in the case where no error is detected. Of course, if an error is detected, the error correction will have to be performed, but this also occurs in the case of a conventional error-correction code memory.

Third Embodiment of a Writing

In case of memories with maskable operations, i.e. memories in which a writing operation can be made in any bits of a word, the two first embodiments solve the problem of the calculation of a new error-correction code after a writing at the cost of a greater complexity of the operations. According to a third embodiment of the present invention, each word is partitioned in a plurality of fields, the writing being possible on all the bits of one or more word fields, and a field code is associated to each field. The field codes can be stored in the same memory as the data fields or in a separated memory. The memory or the memories are organized so that, each time one or more data fields are selected in writing, the code(s) of the corresponding fields are selected. Therefore, at each writing, the values of the data bits to be written in the selected fields are used for calculating the values of the corresponding field codes.

The present invention is likely to have various alterations and modifications which will readily occur to those skilled in the art. In particular, the present invention exhibits advantages even if k–1 to improve masked write operations in error-correction code memories.

The invention claimed is:

1. A data storage method for error detections and corrections in a memory organized to read and write words of a first number (m) of bits and if an error is detected, to modify at least a portion of such a word, comprising the steps of:
   associating an error detection and correction code with a group of a second number (k≧1) of words; and
   at each partial writing in the word group:
   calculating a new error detection and correction code of the modified word group,
   implementing a checking operation and, if an error appears related to a modified word making an error correction of the modified word and if an error appears in the new code, making an error correction of the new code.

2. The method of claim 1, in which each word is a M-bit long word comprising a third determined number r≧1 of elementary m-bit words.

3. The method of claim 1 in which:
   an error-detection code is associated with each word;
   each write operation in a word is preceded by a reading of this word and of its error-detection code; and
   in case of an error, the word group and an error-correction code of said word group are read for error correction and modification of the error-correction code.

4. The method of claim 3, comprising the following steps:
reading, simultaneously with the word in which a writing is made, the error correction code of the word group, and
calculating a new error correction code of the word group by modifying the read error correction code according to values of the bits written in the word and the value of these bits read before writing.

5. The method of claim 2, in which each operation of writing a portion of a word and its code is preceded by reading the word and its code, and a new code of the word is calculated based on values to be written into the write portion of the word and on read values of the other portions of the word, and the new code of the word is written into the memory.

6. The method of claim 5, in which the codes are read from and written into a code memory separate from a word memory, and a cycle of the code memory is offset in time with respect to a cycle of the word memory.

7. The method of claim 5 comprising the steps of:
writing the new code and at least a modified portion of the word without waiting for an error detection or correction in other portions of the word, using a read word and the read code to detect and correct errors in the read word, and in case of detection and correction of errors in the read word:
recalculating the code from values to be written into a portion of the word and the corrected read values of the other portions of the word, and
writing back the recalculated code and eventually the corrected read values of the other portions of the word.

8. The method of claim 2, in which during each write operation in a portion of a word, the other portions of the word are simultaneously read, and a new code is calculated by using the values written into the write portions of the word and values read in the other portions of the word.

9. The method of claim 8, in which the following operations are successively performed:
writing a portion to be replaced of a word,
reading other bits of the word,
reading the word code,
writing the new code of the new word,
checking the read word,
the system being interrupted and the word writing being resumed if the checking of the read word indicates an error.

10. The method of claim 8, in which a writing is performed in only at least one bit of a word, and the method comprises the steps of:
reading, simultaneously with the writing, other bits of the word, calculating error-correction codes for these other bits and for all possible values of the positions of these other bits in the word in which the writing occurs and determining values for which a minimum error is obtained; and
if this minimum error value is zero, considering that the writing has succeeded and calculating a new error-correction code;
if this minimum error value is non-zero, correcting bits at the positions other than those where written the writing had occurred and calculating a new error-correction code.

11. The method of claim 8, in which a writing is performed in at least one bit of a word, and in which a first correction code to restore bits of the word in which the at least one bit is written is based on the values of the other word bits and a second correction code capable of correcting errors in the restored word are both associated with the word, and wherein the errors comprise errors affecting said other word bits as well as errors induced by these errors in the restored bits of the word.

12. The method of claim 2 in which:
an error-detection code is associated with each word;
each write operation in a word is preceded by a reading of this word and of its error-detection code; and
in case of an error, the word group and an error-correction code of said word group are read for error correction and modification of the error-correction code.

13. The method of claim 6 comprising the steps of:
writing the new code and at least a modified portion of the word without waiting for an error detection or correction in other portions of the word,
using a read word and read code to detect and correct errors in the read word, and in case of detection and correction of errors in the read word:
recalculating the code from values to be written into a portion of the word and the corrected read values of the other portions of the word, and
writing back the recalculated code and eventually the corrected read values of the other portions of the word.

14. The method of claim 1, in which said memory makes data write or read operation at each cycle and is implemented by a dual-access memory, a first access of which enables performing at least read operations and a second access of which enables performing at least write operations, each read operation being performed through one of the accesses and each write operation being replaced with a read operation performed through an access and with a write operation performed through the other access.

15. The method of claim 1, in which errors are likely to occur in a single word of a word group, and in which an error-detection code is associated with each word, characterized in that an error-correction code is calculated in the form of an XOR of the error-correction codes of each word.

* * * * *